Oct. 24, 1939.  B. NIGHTENHELSER ET AL  2,177,026

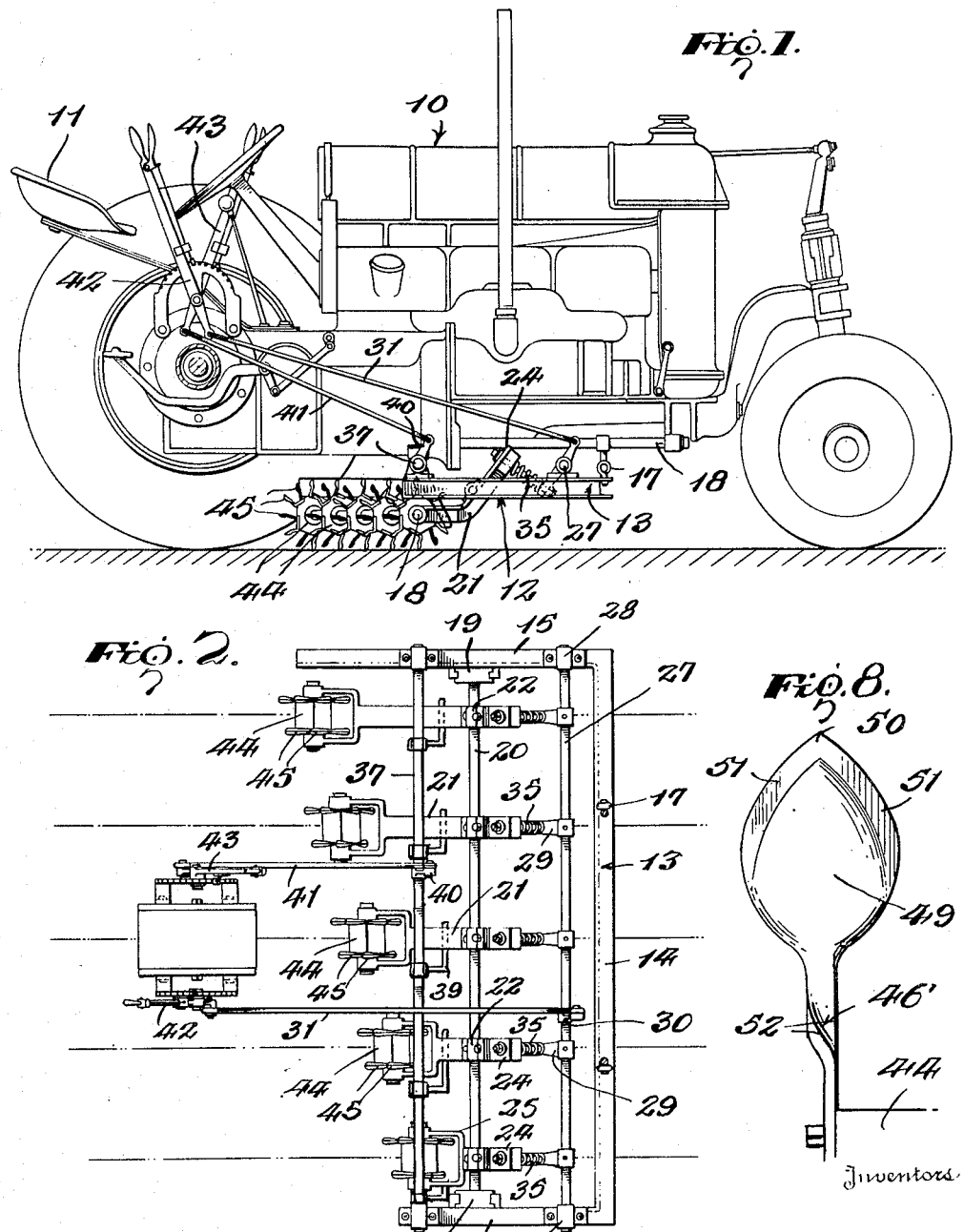

CULTIVATOR

Filed Oct. 31, 1938  2 Sheets-Sheet 2

Patented Oct. 24, 1939

2,177,026

UNITED STATES PATENT OFFICE 2,177,026

CULTIVATOR

Bert Nightenhelser, Westfield, and Julius Ballard, Noblesville, Ind.

Application October 31, 1938, Serial No. 237,998

6 Claims. (Cl. 97—47)

This invention relates to cultivators and particularly to a type which may be readily installed upon a tractor, and it consists in the constructions, arrangements and combinations herein described and claimed.

It is a particular object of the invention to provide a novel construction of cultivator in which a series of digger units are provided, a pair of diggers being employed for cultivation of a row of the crop, and in which the digger spoons are of novel construction effectively loosening the earth around the plants.

It is also an important object of the invention to provide each digger unit with a novel construction of spring mounting, thus eliminating or minimizing damage to the digger spoons in the event that they should encounter rocks, stones and the like.

It is a still further object of the invention to provide a novel means whereby the depth of the digging operation of the spoons may be adjusted, either before or during cultivation operations; and to also provide means for elevating and maintaining the diggers in a raised position, as required when the tractor travels upon a roadway.

Additional objects, advantages and features of invention will be apparent from the following description considered in conjunction with the accompanying drawings, wherein Figure 1 is a side elevation of a tractor partly in section showing the cultivator attached.

Figure 2 is a plan view of the cultivator.

Figure 3 is a longitudinal sectional view of the cultivator, in operative position.

Figure 4 is a similar view showing the cultivator in raised position.

Figure 5 is a side elevation of one of the digger units, detached.

Figure 6 is a fragmentary cross sectional view thereof.

Figure 7 is an enlarged sectional detail of a modified form of the digger spoons.

Figure 8 is a front view of one of the spoons.

Figure 9 is a modified form of spoon mounting.

Attention is first invited to Figure 1 of the drawings wherein we have illustrated conventionally, a tractor 10, which may be of any structure or make, but will include a driver's seat 11.

The cultivator 12 is adapted to be suspended beneath the tractor and in the present instance, comprises a frame 13 consisting of a horizontal beam 14 and integral longitudinal side beams 15 and 16, the beam 15 being of greater length than the beam 16, for a purpose as will appear.

The beam 14 has spaced eyelets or other fastening means 17 for attaching the cultivator to suitable frame portions of the tractor, in the present instance, to strut rods 18. This, of course, will vary according to tractor constructions, but in any event the frame should be so mounted as to partake of up and down movements as will be required during cultivation of a crop.

The side frame members 15 and 16 each have a bearing block 19 which mount a transverse shaft 20, the shaft rockably supporting levers 21. Preferably the levers include removable cap bearings 22 for securement to the shaft 20. The levers 21 will be of increasing lengths from the side frame 16 toward the side member 15, and include a slightly arcuate portion 23 presenting an upturned end portion 24 and a horizontal forked portion 25. A digger unit 26 is revolubly mounted between each forked portion 25, as will be described hereinafter.

Forwardly of the shaft 20 upon the upper face of the side frame 15—16, a rockable shaft 27 is mounted in bearings 28, and at suitable points on the shaft 27, aligned with the upturned end portion 24, there are rigidly secured levers 29, presented downwardly and apertured as at 32, aligned with a similar aperture 33 of the end portion 24. A tie bolt 34 is extended through the aligned apertures, and mounts a helical spring 35 the ends of which bear respectively upon the lever 29 and the portion 24. In order that the tension of the springs 35 may be varied, the bolts include adjusting nuts 36. An actuator lever 30 is also fixed to the shaft 27, presented upwardly and slightly forwardly for mounting a pull and adjusting rod 31.

A transverse shaft 37 is mounted in bearings 38, positioned rearwardly of the shaft 20, and this shaft has fixed thereon lifter arms 39, there being one for each lever 21, and positioned therebelow, as clearly shown in Figures 3 and 4, these arms functioning to elevate the digger units when the cultivating operation is not desired, and for this purpose a lever 40 is fixed to the shaft 37 for connection with a pull rod 41.

The pull and adjusting rod 31 and the pull rod 41 extend rearwardly to a convenient position adjacent the seat 11 and are operatively connected with respective ratchet levers 42 and 43.

Attention is now directed to Figures 5, 6, 7 and 8, for an understanding of the construction of a preferred form of digger units, and it will be noted that the hub thereof is of hexagon shape of substantial transverse thickness, which for practical reasons must be of such width as to present the digger spoons 45 upon opposite sides of a row of plants being cultivated. Obviously, the hub may be of an octagon, square or other suitable shape, this depending upon the number of spoons which it is desired to mount thereon. The spoon 45 is integrally connected with a shank 46, the latter terminating in a substantially right angular foot 47, apertured at suitable points for reception of mounting bolts, as will be described.

The spoons 45 are arranged upon opposite sides of the hub 44 in staggered relation as clearly shown in Figure 5, and thus arranged the foremost aperture of one foot registers with the rearmost aperture of the foot upon the opposite side of the hub and thus aligned a bolt 47' is passed therethrough and through suitable apertures in the hub, effecting a rigid securement of the spoons.

The spoons 45 have a sharp cutting edge 48 for engaging the ground and in actual use will elevate the loosened ground to be discharged therefrom when the spoons have reached a point adjacent top center of rotation of the unit.

In Figures 5 to 8 we have illustrated a form of spoon which has been found highly efficient in use where cultivation operation requires only a loosening or mulching of the earth. The spoon 45 is provided with a bowl portion 49, the forward end 50 and the longitudinal edges 51 being disposed substantially at right angles to the bowl. Also, the shank 46' is preferably given a twist as at 52, the latter functioning to mulch the earth as it passes therethrough. In this form of device, the bowl 50 of the spoon will first engage the earth, and it will be obvious that the earth will be merely mulched and not elevated.

The operation will be readily understood from the following description. The tractor is positioned so that the digger units will be positioned to straddle a row to be cultivated. The lever 43 is actuated so as to lower the units so that the spoons 45 rest upon the ground. The lever 42 is next moved to regulate the depth to which the spoons are to penetrate the ground. Obviously, if the lever 42 is moved to its extreme forward extent the lever 29 will tend to compress the spring 35 against the end 24 of the levers 21 causing a movement of the units in the direction of the ground, thereby effecting a deep penetration of the ground. However, if the lever 42 is moved in a rear direction an elevating movement is given the digger units. Thus, the setting of the digger units may be readily adjusted through adjustment of the lever 42.

With forward movement of the tractor, the spoons will penetrate the soil, causing the digger units to rotate, and in the event that the spoons of any of the units encounter a hard structure such as a stone, root or the like, the lever 21 associated with that unit will partake of an upward movement due to compression of the spring 35, the latter forcing the unit back to normal operative position as soon as the obstruction has been passed. It will thus be seen that a "knee action" cultivator has been presented.

When it is desired to move the tractor from the field onto a highway, the lever 42 may be released and the lever 43 actuated so as to move the lift arms 39 for elevating the levers 21, as shown in Figure 4.

In Figure 9, we have illustrated a modified form of mounting for the digger spoons and as shown, a casting 60 is provided, having a base flange 61 for attachment to the side of the hub 44. The casting 60 is substantially U-shaped, the bight portion 62 mounting an eyelet 63, the stem of which is threaded to receive a nut and lock washer 64. The legs 65 of the casting are apertured as at 66, of a size to freely receive the shank 67 of the digger spoon.

When securing the digger spoons to the hub, the shank 67 is passed through the apertures 66 and through the eyelet 63. The nut 64 is then tightened, drawing the shank rigidly against the outer portion of the aperture. If found necessary, two or more castings may be employed for retention of the spoons.

In this form, it will be apparent that the spoons may be adjusted to various angles, which is important where it is desired to cause earth to be directed inwardly toward the plants, or it may be that the earth should be directed to the opposite side, which could be accomplished by loosening the nut and rotating the spoon to the desired angle.

While we have shown and described a preferred construction of the invention, this is by way of illustration only, and we consider as our own, all such modifications as fairly fall within the scope of the appended claims.

We claim:

1. A cultivator for attachment to the underframe of a tractor comprising a frame having suspension means, a shaft in the frame, a plurality of levers rockably mounted on the shaft intermediate their lengths, a digger unit carried by each lever, at one end, the other end being upwardly inclined, a rockable shaft on the frame forwardly of the first shaft, a plurality of levers carried thereby, the levers being aligned with the upwardly inclined ends of the first lever but spaced therefrom, a tie bolt connecting the levers and a compression spring interposed therebetween.

2. A cultivator for attachment to the underframe of a tractor comprising a frame having suspension means, a shaft in the frame, a plurality of levers rockably mounted on the shaft intermediate their lengths, a digger unit carried by each lever at one end, the other end being upwardly inclined, a rockable shaft on the frame forwardly of the first shaft, a plurality of levers carried thereby, the levers being aligned with the upwardly inclined ends of the first lever but spaced therefrom, a tie bolt connecting the levers, a compression spring interposed therebetween, manual means operable to vary the tension of the springs, and manually operable means for elevating the digger units.

3. A cultivator for attachment to the underframe of a tractor comprising a U-shaped frame having attaching means, a shaft transversely of the frame, a plurality of levers on the shaft, each lever having a forked end and an upwardly inclined end, a digger unit revolubly mounted in each forked end, a transverse rockable shaft on the frame, a plurality of levers carried thereby, the levers being aligned with the upwardly inclined ends of the first named levers but spaced therefrom, a tie bolt connecting the levers, a compression spring on the bolts interposed between the levers, an actuator lever on the rockable shaft, a pull rod and ratchet lever connected with the actuator lever, a second rockable shaft on the frame, lift arms fixed to the shaft having a portion positioned beneath respective first named levers, an actuator lever fixed to the shaft, and a pull rod and ratchet lever operatively connected thereto.

4. A cultivator comprising a U-shaped frame having attaching means, a shaft transversely of the frame, a plurality of levers on the shaft, each lever having a forked end and an upwardly inclined end, a digger unit revolubly mounted in each forked end, said units comprising a hub of substantial width, spoon elements on opposite sides of the hub, the spoons on one side being arranged in alternate relation to those on the other side; a transverse rockable shaft on the frame, a plurality of levers carried thereby, the levers being aligned with the upwardly inclined ends of the first named levers but spaced therefrom, a tie bolt connecting the levers, a compression spring on the bolts interposed between the levers, an actuator lever on the rockable shaft, a pull rod and ratchet lever connected with the actuator lever, a second rockable shaft on the frame, lift arms fixed to the shaft having a portion positioned beneath respective first named levers, an actuator lever fixed to the shaft, and a pull rod and ratchet lever operatively connected thereto.

5. The structure of claim 4, in which the first named levers are of progressively increasing length whereby to position the digger units at varying position of the frame.

6. A cultivator unit comprising a hexagon body of substantial width, digger spoons mounted upon opposite sides thereof, the spoons upon one side being arranged in staggered relation to the spoons on the other side, and said spoons having a sharp soil engaging edge.

BERT NIGHTENHELSER.
JULIUS BALLARD.